Figure 1:
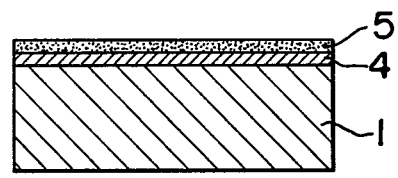

United States Patent [19]

Kuwabara

[11] Patent Number: 4,483,899

[45] Date of Patent: Nov. 20, 1984

[54] INFRARED REFLECTION-PREVENTING FILM

[75] Inventor: Tetsuo Kuwabara, Tokyo, Japan

[73] Assignee: Tokyo Kogaku Kikai Kabushiki Kaisha, Tokyo, Japan

[21] Appl. No.: 444,985

[22] Filed: Nov. 29, 1982

Related U.S. Application Data

[63] Continuation of Ser. No. 230,067, Jan. 29, 1981, abandoned.

[30] Foreign Application Priority Data

Jan. 29, 1980 [JP] Japan .................................. 55-8896

[51] Int. Cl.³ .............................................. B32B 7/02
[52] U.S. Cl. ................................... 428/213; 428/446; 428/469; 428/701

[58] Field of Search ................ 350/1.6, 166; 428/469, 428/701, 913, 213, 446; 427/160

[56] References Cited

U.S. PATENT DOCUMENTS 3,601,471  8/1971  Seddon .............................. 350/166
4,436,363  3/1984  Steinbruegge et al. ............. 350/166

Primary Examiner—George F. Lesmes
Assistant Examiner—Pamela R. Schwartz
Attorney, Agent, or Firm—Brumbaugh, Graves, Donohue & Raymond

[57] ABSTRACT

An infrared reflection-preventing film including a titanium oxide layer disposed on an infrared optical substrate and a film of at least one second layer laid further on said first layer.

3 Claims, 2 Drawing Figures

INFRARED REFLECTION-PREVENTING FILM

This is a continuation of application Ser. No. 230,067, filed Jan. 29, 1981, now abandoned.

This invention relates to an infrared reflection-preventing film having a high moisture resistance.

Ge and Si are known as optical materials for infrared rays. The refractive indices of these materials are n=4.0 for Ge and n=3.4 for Si and consequently, when they are used as optical components, prevention of reflection becomes necessary. As reflection-preventing films, a single layer vacuum-deposited film of ZnS has conventionally been employed for a Ge substrate and a single layer vacuum-deposited film of SiO for a Si substrate. Their optical thickness nd for the center wavelength of the reflection-preventing wavelength band is $nd = \lambda_o/4$. As a double-layered reflection-preventing film for the Ge substrate and the Si substrate, there is a film which consists of a first layer (as counted from the substrate) of ZnS and a second layer of $MgF_2$. The optical thickness of each layer is $nd = \lambda_o/4$. Of the abovementioned infrared reflection-preventing films, SiO is disadvantageous in that it has an absorption band from 8 to 12 μm. On the other hand, the infrared reflection-preventing film using ZnS as the first layer is disadvantageous in that peeling of the film occurs from the periphery of the vacuum-deposited surface in an atmosphere at a temperature of 50° C. and a relative humidity of 95% or above within about 24 hours.

To improve upon this drawback of low moisture resistance, a proposed method sets the substrate temperature to 200° to 250° C. during the vacuum deposition of ZnS on the Ge substrate. However, this method is not entirely satisfactory because the moisture resistance is only to a small degree, and ZnS becomes turbid so that transmissivity is reduced due to surface scattering.

Another proposal subjects the Ge substrate to ion bombardment before the vacuum deposition of ZnS. Though this proposal can improve the moisture resistance to some extent, peeling occurs from the periphery of the film within 24 hours during a water immersion test, and insufficient moisture resistance does not allow use as an optical component.

On the other hand, Japanese patent publication No. 17870/1975 proposes forming a vacuum deposition film of an adhesion-reinforcing substance such as lead telluride, lead selenide or the like, that is transparent in the infrared region and has a refractive index equal to that of the substrate, between the Ge substrate and the ZnS first reflection film. In view of the transmission characteristic with respect to the wavelength falling in the infrared region, however, it is not possible to use the reinforcing substance as the reflection-preventing film for an infrared optical element in the wavelength region below 1.8 μm because even Ge, which has the shortest absorption end, has large absorption below 1.8 μm and its transmissivity is markedly reduced. For the same reason, since the abovementioned materials are opaque to visible rays, infrared photometry, crystal oscillator control or the like must be used in controlling the film thickness.

The present invention seeks to provide an infrared reflection-preventing film which is excellent in moisture resistance and which is capable of being used in the near infrared region, the thickness of which can be controlled by both infrared rays and visible rays, by eliminating the drawbacks encountered in the prior art.

According to the present invention, the above and other objects can be accomplished by an infrared reflection-preventing film including a titanium oxide layer (TiO, $Ti_2O_3$ or $TiO_2$) disposed on an infrared optical substrate and a film of at least one second layer laid further on said first layer. In case where the substrate is of Ge or Si, the second layer should preferably be comprised of ZnS. The first and second layers should preferably have the following optical thicknesses with respect to a center wavelength of the wavelength band of a light bundle of which reflection is to be prevented.

$$n_1 d_1 + n_2 d_2 = \lambda_o/4$$

$$10 \text{ nm} \leq n_1 d_1 \leq 50 \text{ nm}$$

where $n_1 d_1$ is an optical thickness of said titanium oxide film, $n_2 d_2$ is an optical thickness of said second layer, and $\lambda_o$ is a center wavelength of the reflection-preventing wavelength band.

Figure 2:
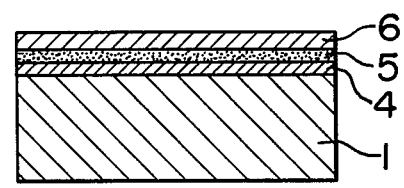

In order that the invention be more clearly understood, descriptions will further be made with reference to the accompanying drawings, in which:

FIGS. 1 and 2 are sectional views showing different embodiments of the infrared reflection-preventing film in accordance with the present invention.

Referring now to the drawings, FIG. 1 shows an embodiment of the present invention which corresponds to the conventional reflection-preventing film using a single layer. Formed on the Ge substrate 1 by vacuum deposition are a first layer 4 of a titanium oxide, which is $TiO_2$ in this embodiment, and a second layer 5 of ZnS. The titanium oxide is vacuum deposited by a tungsten boat or electron gun method.

The optical thickness $n_1 d_1$ of the first layer and that $n_2 d_2$ of the second layer are related by the expression $$n_1 d_1 + n_2 d_2 = \lambda_o/4$$

The titanium oxide as the first layer serves as an adhesion-reinforcing member to strengthen the adhesion between the substrate and the second layer, and an optical thickness on the order of several microns is sufficient. In view of film thickness control, however, the required optical thickness is at least 10 nm. It is preferred, on the other hand, that the titanium oxide be as thin as possible because of the absorption in the infrared wavelength band. Hence, the upper limit to the film thickness for reinforcing adhesion is 50 nm.

As another embodiment, the first layer of the titanium oxide film and the second layer of ZnS may also be formed on the Si substrate, whereby the film thickness relationship is the same as in the first embodiment.

In these embodiments, it is of course possible to form a multi-layered reflection-preventing film by disposing vacuum deposition films of the third and more layers. For example, it is possible to form the first layer 4 of the titanium oxide, the second layer 5 of ZnS and a third layer 6 of $MgF_2$ on the Si or Ge substrate 1 as depicted in FIG. 2.

Next, the results of a strength test applied to the reflection-preventing films in accordance with the present invention will be described. As examples of the prior art using the Ge substrate, there are used (A) a film in which ZnS is vacuum deposited after ion bombardment treatment and (B) a film in which ZnS is vacuum deposited after an adhesion-reinforcing vacuum deposition film for Ge is formed ($n_{Ge}d_{Ge} = 0.3 n_{ZnS}d_{ZnS}$). These films (A) and (B) are compared with the film (C) which is in accordance with the present invention.

Moisture resistance test (A) Microscopic peeling occurs within one day around the periphery of the film.
(B) Same as above.
(C) No peeling occurs even after one week.

Water immersion test (A) Microscopic peeling occurs within one day around the periphery of the film, and almost total peeling occurs within one month.
(B) Peeling occurs within one day around the periphery of the film.
(C) Microscopic peeling occurs within one week, but the progress of peeling is slight even after one month.

The moisture resistance test was carried out by leaving each film standing in an atmosphere at a temperature of 50° C. and a relative humidity of at least 95%, while the water immersion test was carried out by immersing each film in service water and leaving it stand. The vacuum evaporation of the films was effected at the same substrate temperature in all cases.

As described above, the film of the present invention has excellent moisture resistance and can be used also in the near infrared region in comparison with the film using the Ge adhesion-reinforcing film. Furthermore, both visible ray photometry and infrared photometry can be employed for controlling the film thickness.

The invention has thus been shown and described with reference to specific embodiments, however, the invention is in no way limited to the details of the illustrated structures but changes and modifications may be made without departing from the scope of the appended claims.

I claim:

1. An infrared reflection-preventing film comprising an infrared optical substrate and at least a first layer of titanium oxide on the optical substrate and a second layer of zinc sulfide on the first layer, the layers satisfying the relationships:

$$n_1 d_1 + n_2 d_2 = \lambda_0 / 4$$

and $$10 \text{ nm} \leq n_1 d_1 \leq 50 \text{ nm}$$

where $n_1 d_1$ is an optical thickness of said first layer, $n_2 d_2$ is an optical thickness of said second layer, and $\lambda_0$ is a center wavelength of a desired reflection-preventing wavelength band.

2. The infrared reflection-preventing film of claim 1 wherein the substrate is selected from the group consisting of Ge or Si.

3. The infrared reflection-preventing film of claim 1 wherein the film contains a third layer of $MgF_2$ on said second layer.

* * * * *